(12) United States Patent
Takahashi

(10) Patent No.: US 7,969,682 B2
(45) Date of Patent: Jun. 28, 2011

(54) HEAD CONTROL DEVICE, STORAGE DEVICE, AND MAXIMUM POWER DETERMINING METHOD

(75) Inventor: Tetsuya Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 844 days.

(21) Appl. No.: 11/894,106

(22) Filed: Aug. 20, 2007

(65) Prior Publication Data
US 2008/0123511 A1 May 29, 2008

(30) Foreign Application Priority Data
Nov. 27, 2006 (JP) .................................. 2006-319110

(51) Int. Cl.
*G11B 21/02* (2006.01)
*G11B 5/02* (2006.01)
(52) U.S. Cl. .......................................... 360/75; 360/55
(58) Field of Classification Search .................. None
See application file for complete search history.

(56) References Cited

U.S. PATENT DOCUMENTS

| 4,777,544 | A | 10/1988 | Brown et al. |
| 7,324,299 | B1 | 1/2008 | Schreck et al. |
| 7,508,617 | B1 * | 3/2009 | Mak et al. ........................ 360/75 |
| 2003/0174430 | A1 | 9/2003 | Takahashi et al. |
| 2005/0024775 | A1 | 2/2005 | Kurita et al. |
| 2006/0139789 | A1 | 6/2006 | Yang |

FOREIGN PATENT DOCUMENTS

| CN | 1581297 | 2/2005 |
| EP | 0 256 356 A2 | 2/1998 |
| EP | 1 677 290 A2 | 7/2006 |
| JP | 11-045436 | 2/1999 |
| JP | 2000-195211 | 7/2000 |
| JP | 2003-272335 | 9/2003 |

* cited by examiner

*Primary Examiner* — Daniell L Negrón
(74) *Attorney, Agent, or Firm* — Greer, Burns & Crain, Ltd.

(57) ABSTRACT

A signal-level calculating unit calculates a signal level based on a gain signal. A sample generating unit associates heater power with the signal level and generates samples used for determining the maximum power. An approximation-line determining unit determines an approximation line of the samples in a two-dimensional coordinate system. A line shifting unit shifts the approximation line and determines a line for determining a signal level when the heater power is increased by one step. A comparative-value calculating unit calculates a comparative value based on the line. An upper-limit determining unit compares the comparative value and an actual signal level, and determines whether the heater power has reached the maximum power.

11 Claims, 11 Drawing Sheets

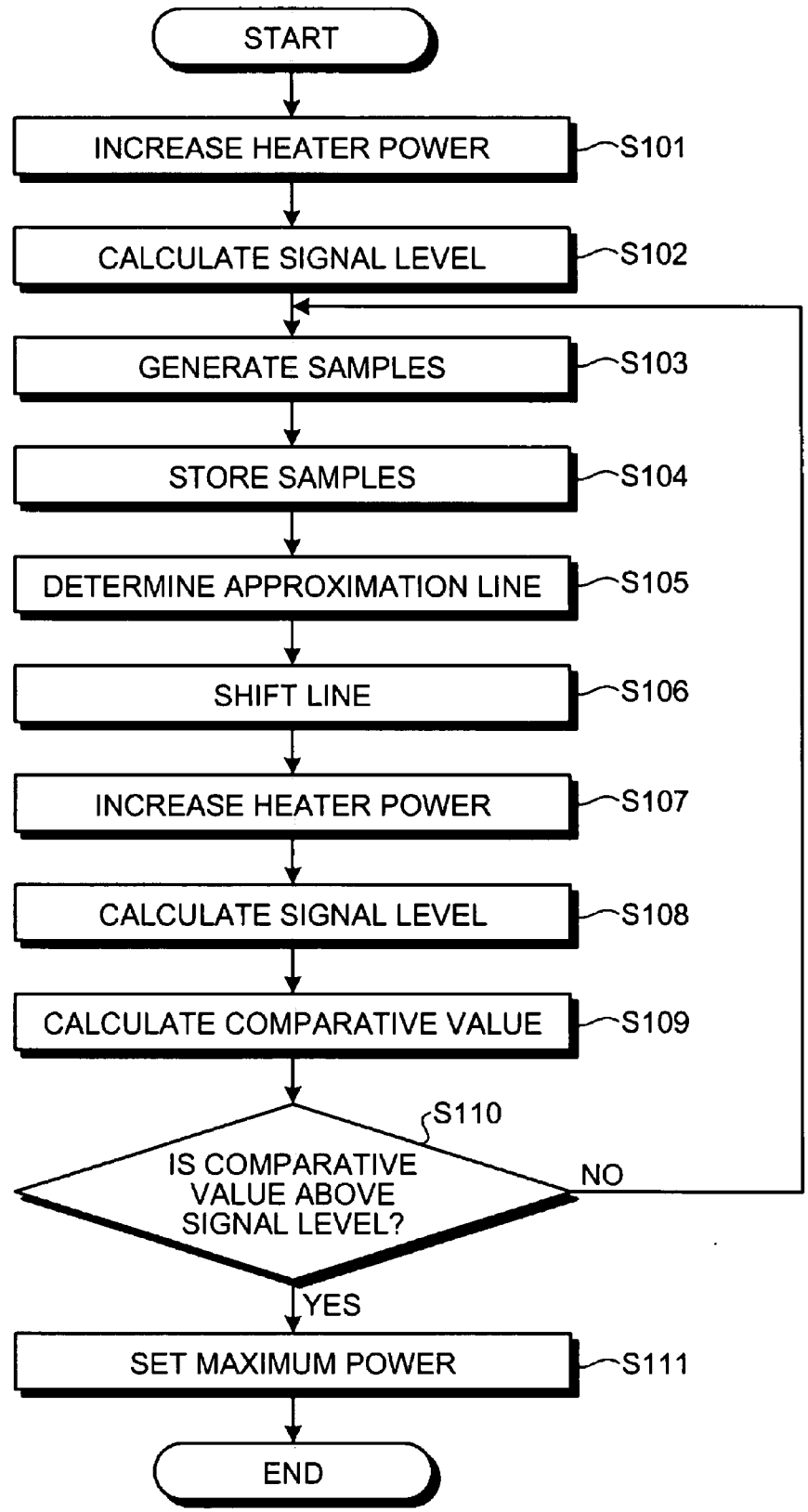

HEAD CONTROL DEVICE, STORAGE DEVICE, AND MAXIMUM POWER DETERMINING METHOD

BACKGROUND OF THE INVENTION

1. Field of the Invention

The present invention relates to a head control device, a storage device, and a maximum power determining method.

2. Description of the Related Art

Data is generally stored in or written to a disk medium in a storage device such as a magnetic disk device or a magneto optical disk device by a head without coming into contact with the disk medium. As the head senses signals produced by a magnet or a laser beam, the sensitivity of the head to the signals increases with the closing of the distance between the head and the disk medium, resulting in increased precision in reading and writing data. With the increasing surface density of the disk medium, the distance between the head and the disk medium, called the floating magnitude, has come to be set to a miniscule value of 10 nanometers or less.

Increasing the minisculeness of the floating magnitude has necessitated a stricter monitoring of fluctuations in the floating magnitude due to variation in the environment. For example, Japanese Patent Application Laid-open No. H11-45436 discloses a technology for monitoring the fluctuations in the floating magnitude by amplitude or jitter amount of signal waveforms generated by the head.

Further, to answer the need for accurately controlling the position of the leading end of the head and to maintain a constant distance between the leading end of the head and the surface of the disk medium (hereinafter, "spacing"), Japanese Patent Application Laid-open No. 2003-272335 has disclosed a technology for adjusting the spacing. In this technology, a heating coil and a thermally-expanding member are provided within the head, and the spacing is adjusted by supplying current to the heating coil and causing the thermally-expanding member to protract, thereby causing the surface of the head facing the magnetic disk to protract towards the magnetic disk. In other words, as shown in FIG. 11, the spacing is adjusted by heating a heater such as a heating coil provided inside a head 100 and causing a head end 102 provided in a data recording/reproducing element 101 to protract towards a magnetic disk 200.

However, if spacing is adjusted by heating the heater, the heater power may become excessive, leading to contact of the head end coming into contact with the surface of the disk medium (hereinafter, "touchdown"), damaging both the head end and the surface of the disk medium and hindering the spinning of the disk medium. In other words, increasing the heater power of the heater causes, as shown in FIG. 12, the head end 102 to touchdown on the surface of the magnetic disk 200. If the heater power continues to be increased after touchdown, due to microscopic unevenness on the surface of the magnetic disk 200, the head end 102 and the surface of the magnetic disk 200 will get damaged as the magnetic disk 200 spins.

Especially, when adjusting the spacing by regulating the heater power, calibration needs to be kept ready so that correspondence relation of the heater power and the spacing can be obtained. For calibration purposes, the heater power has to be increased beyond normal operating conditions and if the heater power is increased excessively, the head end and the disk medium are likely to get damaged under normal operating conditions, leading to error when recording signals to or reading signals from the disk medium.

SUMMARY OF THE INVENTION

It is an object of the present invention to at least partially solve the problems in the conventional technology.

According to an aspect of the present invention, a head control device that controls, by thermal expansion caused by a heater, a position of a head that faces a storage medium and reads signals of data recorded on the storage medium, includes a control unit that increases heater power of the heater by a predetermined range, an obtaining unit that obtains a sample of an index value of a signal level read from the storage medium at each heater power controlled by the control unit, a function determining unit that determines a determining function for determining current heater power based on samples obtained up to a point the heater power is increased to last heater power, a calculating unit that calculates a comparative value corresponding to the current heater power based on the determining function, and a maximum-power determining unit that determines whether the current heater power is the maximum power by comparing the comparative value and the index value of the signal level corresponding to the current heater power.

According to another aspect of the present invention, a storage device that stores data in a storage medium, includes a recording and reproducing unit that faces the storage medium and reads signals from and writes signals to the storage medium, a heater that adjusts a position of the recording and reproducing unit by thermal expansion, a control unit that increases heater power of the heater by a predetermined range, an obtaining unit that obtains a sample of an index value of a signal level read from the storage medium at each heater power controlled by the control unit, a function determining unit that determines a function for determining current heater power based on samples obtained up to a point the heater power is increased to last heater power, a calculating unit that calculates a comparative value corresponding to the current heater power based on the function, and a maximum-power determining unit that determines whether the current heater power is the maximum power by comparing the comparative value and the index value of the signal level corresponding to the current heater power.

According to still another aspect of the present invention, a maximum power determining method for determining the maximum power of a heater that controls, by thermal expansion, a position of a head that faces a storage medium and reads signals of data recorded on the storage medium, includes first increasing heater power of the heater by a predetermined range, obtaining a sample of an index value of a signal level read from the storage medium at each heater power controlled at the first increasing, determining a function for determining current heater power based on the sample, second increasing heater power of the heater by a predetermined range, calculating a comparative value corresponding to the heater power controlled at the second increasing based on the function, comparing the comparative value and the index value of the signal level corresponding to the heater power controlled at the second increasing, and determining whether the heater power controlled at the second increasing is the maximum power.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of a maximum power determining process according to the first embodiment;

DETAILED DESCRIPTION OF THE PREFERRED EMBODIMENTS

Exemplary embodiments of the present invention are described in detail below with reference to the accompanying drawings. In the following description, a magnetic disk device is taken as an example of a storage device. The present invention, however, can be equally applied to other types of storage medium such as magneto optic disk device or optical disk device from which data is read by a head, or to a head tester that is fixed to measure and analyze head characteristics.

Figure 1:
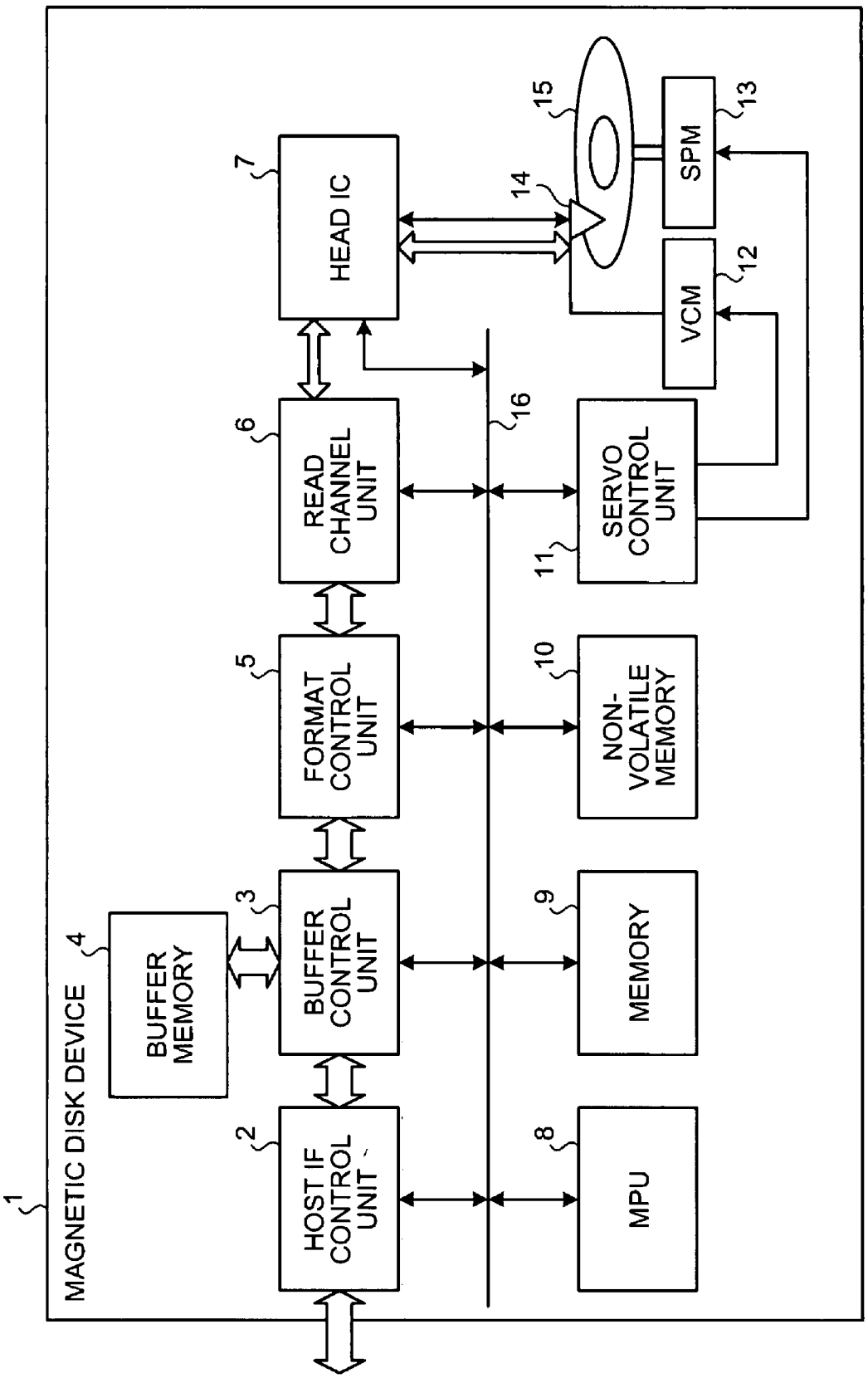
FIG. 1 is a block diagram of a magnetic disk device according to a first embodiment of the present invention.

FIG. 1 is a block diagram of a magnetic disk device 1 according to a first embodiment of the present invention. The magnetic disk device 1 includes a host interface (IF) control unit 2, a buffer control unit 3, a buffer memory 4, a format control unit 5, a read channel unit 6, a head integrated circuit (IC) 7, a micro processing unit (MPU) 8, a memory 9, a non-volatile memory 10, a servo control unit 11, a voice coil motor (VCM) 12, a spindle motor (SPM) 13, a head 14, a magnetic disk 15, and a common bus 16.

The host IF control unit 2 connects the magnetic disk device 1 to a host, which is a higher-level device, and controls the communication between the magnetic disk device 1 and the host. The buffer control unit 3 controls the buffer memory 4. The buffer memory 4 temporarily stores the data exchanged between the host and the magnetic disk device 1.

The format control unit 5 controls data reading, and for example performs error check on read data. The read channel unit 6 amplifies data signals output from the head IC 7 during data reading, and carries out predetermined processes such as analog-to-digital (AD) conversion and demodulation. The head IC 7 includes a not shown preamplifier and, during data reading, amplifies the data signals read by the head 14.

The MPU 8 performs master control of the magnetic disk device 1 by a predetermined control program (firmware program). In other words, the MPU 8 deciphers command issued by the host and performs integrated control of reading data from and writing data to the magnetic disk 15 by controlling various processing units. In the first embodiment, the MPU 8 determines an upper limit for a heater power that determines the position of a leading end of the head 14, controls a heater provided within the head 14 so that the heater power is within the set upper limit, thereby controlling the distance (spacing) between the leading end of the head 14 and the surface of the magnetic disk 15. A determining process of the upper limit for the heater power by the MPU 8 is described later.

The memory 9 and the non-volatile memory 10 store therein the firmware program run by the MPU 8 and various types of data required for the control process. The servo control unit 11 checks the operation status of the VCM 12 and the SPM 13 while driving them. The VCM 12 adjusts the position of the head 14. The SPM 13 spins the magnetic disk 15 and adjusts a data reading location by the head 14.

A not shown recording-reproducing element is provided at the leading end of the head 14 adjoining the magnetic disk 15. The recording-reproducing element writes data signals to and reads data signals from the magnetic disk 15. The head 14 further includes a not shown heater provided for adjusting the distance (spacing) between the leading end of the head 14 and the surface of the magnetic disk 15. The heater causes the leading end to thermally expand, decreasing the spacing. The magnetic disk 15 is a storage medium having a magnetic body, and magnetically records data when the magnetization state of the magnetic body is altered. The common bus 16 connects all the processing units of the magnetic disk device 1 and facilitates exchange of data among the processing units.

Figure 2:
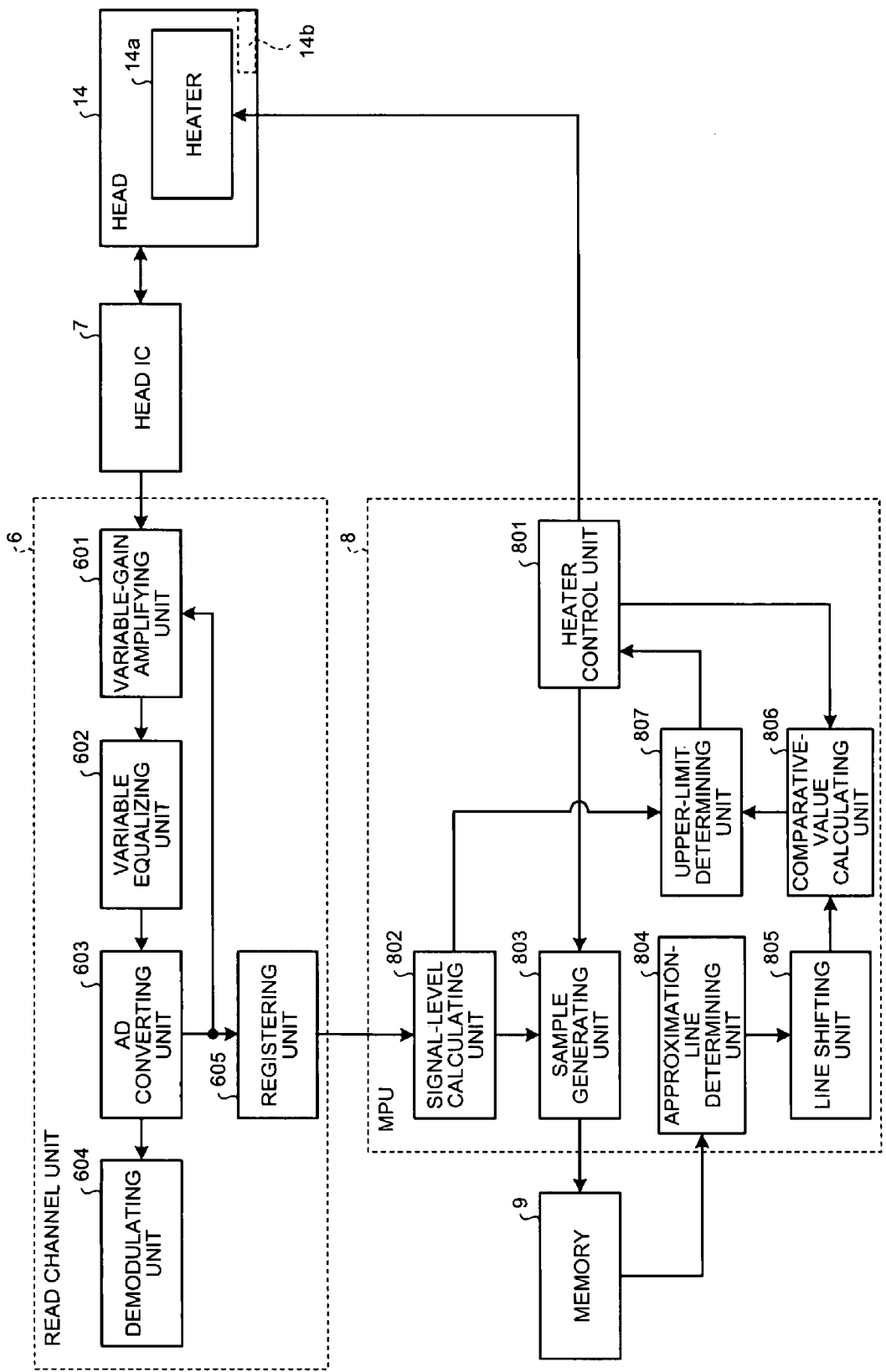
FIG. 2 is a block diagram of principal parts of the magnetic disk device according to the first embodiment.

FIG. 2 shows block diagrams of the read channel unit 6 and the MPU 8 of the magnetic disk device 1 according to the first embodiment. The read channel unit 6 includes a variable-gain amplifying unit 601, a variable equalizing unit 602, an AD converting unit 603, a demodulating unit 604, and a registering unit 605.

The variable-gain amplifying unit 601 includes a variable gain amplifier that can vary gain. The variable-gain amplifying unit 601 sets the gain of the variable gain amplifier according to feedback gain signals from the AD converting unit 603 and amplifies the data signals output from the head IC 7. The variable-gain amplifying unit 601 sets the gain in such a way that the level of the data signals output after amplification is steady. In other words, the variable-gain amplifying unit 601, the variable equalizing unit 602, and the AD converting unit 603 together form an auto gain control (AGC) loop.

The variable equalizing unit 602 adjusts frequency characteristic of the data signals amplified by the variable-gain amplifying unit 601 and outputs the resultant data signals to the AD converting unit 603.

The AD converting unit 603 converts the data signals output from the variable equalizing unit 602 to digital data signals, and outputs the digital data signals to the demodulating unit 604. The AD converting unit 603 also generates, based on the level of the data signals output from the variable equalizing unit 602, the feedback gain signals for controlling the gain of the variable-gain amplifying unit 601, and outputs the feedback gain signals to the variable-gain amplifying unit 601 as well the registering unit 605.

The demodulating unit 604 demodulates the digital data signals output as a result of AD conversion, and outputs the resultant demodulated signals to the format control unit 5 that performs error check on data.

The registering unit 605 temporarily holds the gain signals output from the AD converting unit 603 and feeds the gain signals to the MPU 8. The gain signals held by the registering unit 605 indicate the gain used for amplification of the data signals entering the variable-gain amplifying unit 601 in order to maintain the level the data signals steady. If the level of the signals read by the head 14 is small, the gain is large, and if the level of the signals is large, the gain is small. Accordingly, the signal level of the data signals read by the head 14 can be obtained based on the gain signals held by the registering unit 605.

Returning to FIG. 2, the MPU 8 includes a heater control unit 801, a signal-level calculating unit 802, a sample generating unit 803, an approximation-line determining unit 804, a line shifting unit 805, a comparative-value calculating unit 806, and an upper-limit determining unit 807.

The heater control unit 801 controls the heater power of a heater 14a provided within the head 14. Specifically, when obtaining correspondence between the heater power and the spacing for calibration, the heater control unit 801 steps up the heater power by a predetermined control range from zero while conveying the heater power to the sample generating unit 803 and the comparative-value calculating unit 806. When conveyed by the upper-limit determining unit 807 that the upper limit of the heater power (hereinafter, "maximum power") has been reached, the heater control unit 801 stops stepping up the heater power. Under normal operating conditions, the heater control unit 801 controls the heater power to a level below the maximum power so that the a spacing of intended magnitude is obtained.

In the first embodiment, when the heater control unit 801 controls the heater power of the heater 14a provided within the head 14, the spacing gets adjusted by the thermal expansion of a head end 14b towards the magnetic disk 15. The not shown recording-reproducing element provided in the head end 14b reads data signals from and writes data signals to the magnetic disk 15.

The signal-level calculating unit 802 calculates the signal level read by the head end 14b of the head 14 based on the gain signals being fed from the registering unit 605 of the read channel unit 6. In other words, the signal-level calculating unit 802 calculates the signal level prior to being converted to a steady level by the read channel unit 6, and outputs the calculated signal level to the sample generating unit 803 and the upper-limit determining unit 807.

The sample generating unit 803 associates the heater power conveyed by the heater control unit 801 and the signal level output from the signal-level calculating unit 802, and generates samples to be used in an upper limit determining process. As the signal level output by the signal-level calculating unit 802 tends to be unstable when the heater power is in the vicinity of zero, the sample generating unit 803 can be configured to generate samples only when the heater power is above a predetermined initial value. Specifically, the sample generating unit 803 can be configured to generate a sample when the heater power reaches 8 mW (milliwatts) or thereabouts. The sample generating unit 803 stores the generated samples in the memory 9.

The approximation-line determining unit 804 reads the samples from the memory 9 and determines the approximation line that approximates the samples in a two-dimensional coordinate system, with the heater power and the signal level forming the coordinate axes. Specifically, the approximation-line determining unit 804 applies the least-square method on the signal level corresponding to each heater power value to decide the approximation line for which the sum of distances corresponding to all the samples is the least.

The line shifting unit 805 shifts the approximation line determined by the approximation-line determining unit 804 and determines a signal-level determining line for determining the signal level when the heater power is increased by one step. In other words, the line shifting unit 805 shifts the approximation line in such a way that the signal level corresponding to each heater power value for the approximation line determined by the approximation-line determining unit 804 is decreased by a predetermined percentage. Specifically, the line shifting unit 805 shifts the approximation line so that the signal level corresponding to each heater power value is decreased by 4%. Thus, if the approximation line is expressed by the approximation function shown in Equation (1) given below, the line shifting unit 805 determines the line formed by signal level determining function of Equation (2) given below by shifting the approximation line by 4%.

$$y=ax+b \text{ (where a and b are approximation line parameters)} \quad (1)$$

$$y=0.96ax+0.96b \quad (2)$$

where y denotes the signal level, x denotes the heater power.

The comparative-value calculating unit 806 calculates a comparative value for comparing the signal level corresponding with the current heater power using the line determined by the line shifting unit 805. In other words, the comparative-value calculating unit 806 calculates the comparative value by substituting the signal level determining function of Equation (2) with the current heater power. The comparative-value calculating unit 806 calculates the comparative value using the line determined based on the samples obtained in the period up to a heater power that is less than the current heater power by one control range. Accordingly, the comparative-value calculating unit 806 does not have to wait for other processors for processes such as, generating a sample corresponding to the current heater power or determining the approximation line, etc., when calculating the comparative value.

The upper-limit determining unit 807 compares the comparative value calculated by the comparative-value calculating unit 806 and the signal level calculated by the signal-level calculating unit 802 and determines whether the heater power has reached the maximum power. Maximum power refers to a heater power at which the head end 14b touches down on the magnetic disk 15, and if stepping up of the heater power is continued beyond the maximum power, the head end 14b and the surface of the magnetic disk 15 will abrade against each other. Accordingly, if the signal level is greater than the comparative value, indicating that the rate of increase of the signal level with the increase in the heater power is greater than a predetermined threshold, the upper-limit determining unit 807 determines that the head end 14b has not touched down on the magnetic disk 15 and therefore, that the heater power has not reached the maximum power. If the signal level is less than the comparative value, indicating that the rate of increase of the signal level with the increase in the heater power is greater than a predetermined threshold, the upper-limit determining unit 807 determines that the head end 14b has touched down on the magnetic disk 15 and therefore, that the heater power has reached the maximum power.

Touchdown refers to when the head end 14b and the magnetic disk 15 come into contact with each other. Even if the heater power is stepped up beyond the point when touchdown occurs, causing the head end 14b to thermally expand, the spacing cannot be decreased further and the signal level cannot be increased. Therefore, in the first embodiment, when the signal level falls below the comparative value is taken as the point when the rate of increase of the signal level is curbed and that touchdown has occurred. Damage to the head end 14*b* and the surface of the magnetic disk 15 is prevented by taking the heater power at which touchdown occurs (touchdown point) is regarded as the maximum power.

A maximum power determining process performed by the magnetic disk device 1 configured as described above is described below. FIG. 3 is a flowchart of the maximum power determining process performed by the magnetic disk device 1.

The heater control unit 801 increases the heater power of the heater 14*a* provided within the head 14 by a predetermined control range (step S101), and conveys the heater power to the sample generating unit 803. The head end 14*b* thermally expands due to increase in the heater power and the recording-reproducing element protracts towards the surface of the magnetic disk 15. The recording-reproducing element reads the data from the magnetic disk 15, and the signal level of the read data signals is calculated by the signal-level calculating unit 802 (step S102).

In other words, after the heater power is increased, the data signals read by the recording-reproducing element provided in the thermally-expanded head end 14*b* are input into the read channel unit 6 via the head IC 7. The gain signal produced by the AGC loop in the read channel unit 6 is fed to the signal-level calculating unit 802. The signal-level calculating unit 802 calculates the signal level based on the gain signal. If the current heater power is greater than a predetermined initial value, the sample generating unit 803 associates the heater power values and the signal levels, and generates samples (step S103). Specifically, as it is considered that a stable output of signal level is obtained only when the heater power is greater than a predetermined initial value, for example, 8 mW, the sample generating unit 803 generates samples after the prescribed heater power is reached. The samples are stored in the memory 9 (step S104).

Figure 4A:
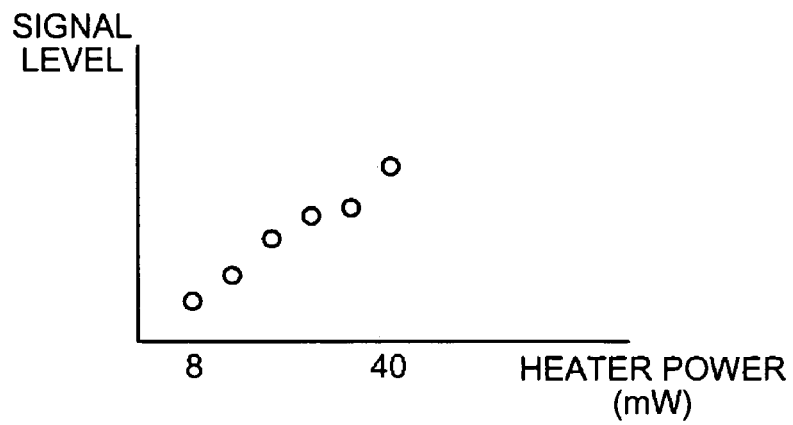
FIGS. 4A, 4B, and 4C are graphs for explaining a signal level determining process according to the first embodiment.

The samples stored in the memory 9, when plotted in a two-dimensional coordinate system with the heater power and the signal level forming the coordinate axes, are aligned in a substantially straight line, as shown in FIG. 4A. However, as the heater power approaches the touchdown point, the rate of increase in the signal level falls with the increase in the heater power, and the samples are not aligned in a single straight line. In FIG. 4A, samples up to 40 mW of heater power are shown aligned in a single straight line, as up to about 40 mW of heater power, there is a clear gap between the head end 14*b* and the magnetic disk 15.

Figure 4B:
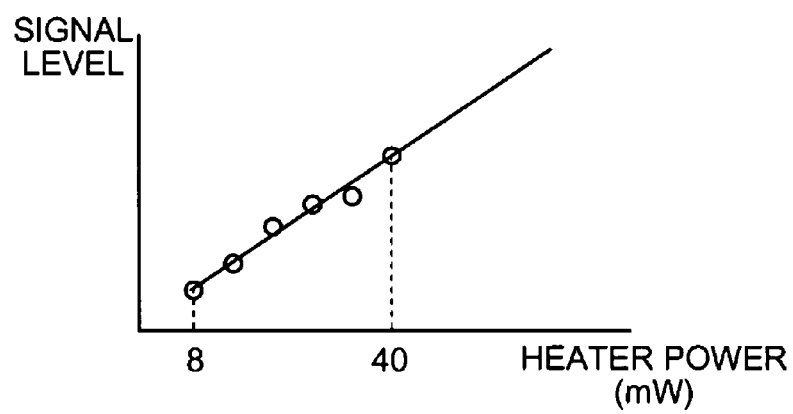

The approximation-line determining unit 804 reads the samples from the memory 9 and applying the least-square method, determines the approximation line that approximates the samples (step S105). The approximation line is expressed by Equation (1). The approximation line indicates an average rate of increase of the signal level with the increase in the heater power up to the current heater power controlled by the heater control unit 801, and is a line like the one shown in FIG. 4B. FIG. 4B shows the approximation line that is obtained when the current heater power is 40 mW.

Upon determination of approximation line by the approximation-line determining unit 804, the line shifting unit 805 shifts the approximation line (step S106). Specifically, the line shifting unit 805 shifts the approximation line obtained when the signal level at each point on the approximation line is decreased by a predetermined percentage. Specifically, by decreasing the signal level by 4% at each point on the approximation line, the approximation line expressed by Equation (1) is shifted to a line expressed by the signal level determining function of Equation (2). The signal-level determining line thus obtained is output to the comparative-value calculating unit 806.

Meanwhile, the heater control unit 801 increases the heater power of the heater 14*a* by a control range (step S107). Assuming that the control range is 4 mW, if the heater power of 40 mW is increased by 4 mW, the heater control unit 801 conveys the heater power of 44 mW to the sample generating unit 803 and the comparative-value calculating unit 806. The increase in the heater power causes the head end 14*b* to thermally expand and the recording-reproducing element to protract closer towards the surface of the magnetic disk 15. The recording-reproducing element reads data signals from the magnetic disk 15 and the signal-level calculating unit 802 calculates the signal level of the data signals read by the recording-reproducing element (step S108).

After calculation of the signal level, the signal-level calculating unit 802 determines, based on the signal-level determining line determined at the heater power of 40 mW, whether the heater power of 44 mW is the maximum power. In other words, upon being conveyed the heater power by the heater control unit 801, the comparative-value calculating unit 806 calculates a comparative value for comparing with the current heater power (step S109). Specifically, the comparative-value calculating unit 806 calculates the signal level at the heater power of 44 mW as a comparative value on the signal-level determining line determined at the heater power of 40 mW. Accordingly, x of Equation (2) is substituted by the current heater power, and y is calculated as the comparative value.

Figure 4C:
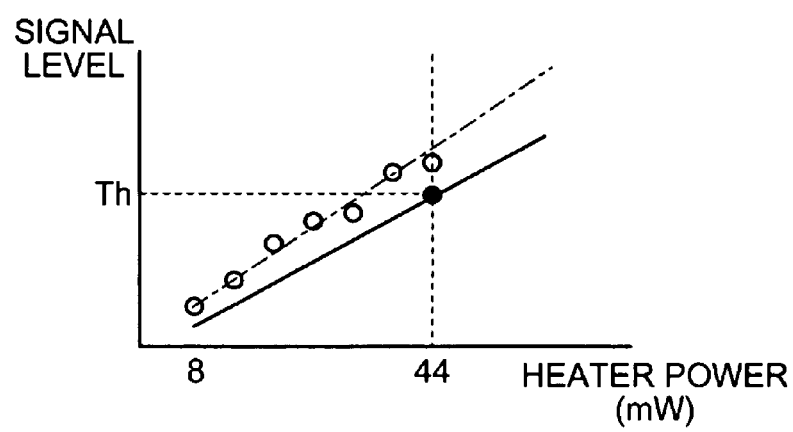

In FIG. 4C, the approximation line is indicated by a dashed line, the signal-level determining line is indicated by a solid line, and the comparative value calculated at the heater power of 44 mW is indicated by Th. The comparative value Th indicates a signal level based on which it is determined that touchdown has occurred at the current heater power of 44 mW.

Thus, the upper-limit determining unit 807 compares the signal level calculated by the signal-level calculating unit 802 and the comparative value calculated by the comparative-value calculating unit 806, and determines the magnitudes of the signal level and the comparative value (step S110). If, as a result, the signal level is above the comparative value (No at step S110) as shown in FIG. 4C, the upper-limit determining unit 807 determines that touchdown has not occurred as the rate of increase of the signal level with the increase in the heater power has not decreased to a predetermined threshold. The sample generating unit 803 generates the sample at the heater power of 44 mW, and the approximation-line determining unit 804 once again determines the approximation line, and the line shifting unit 805 once again determines the signal-level determining line.

Figure 5:
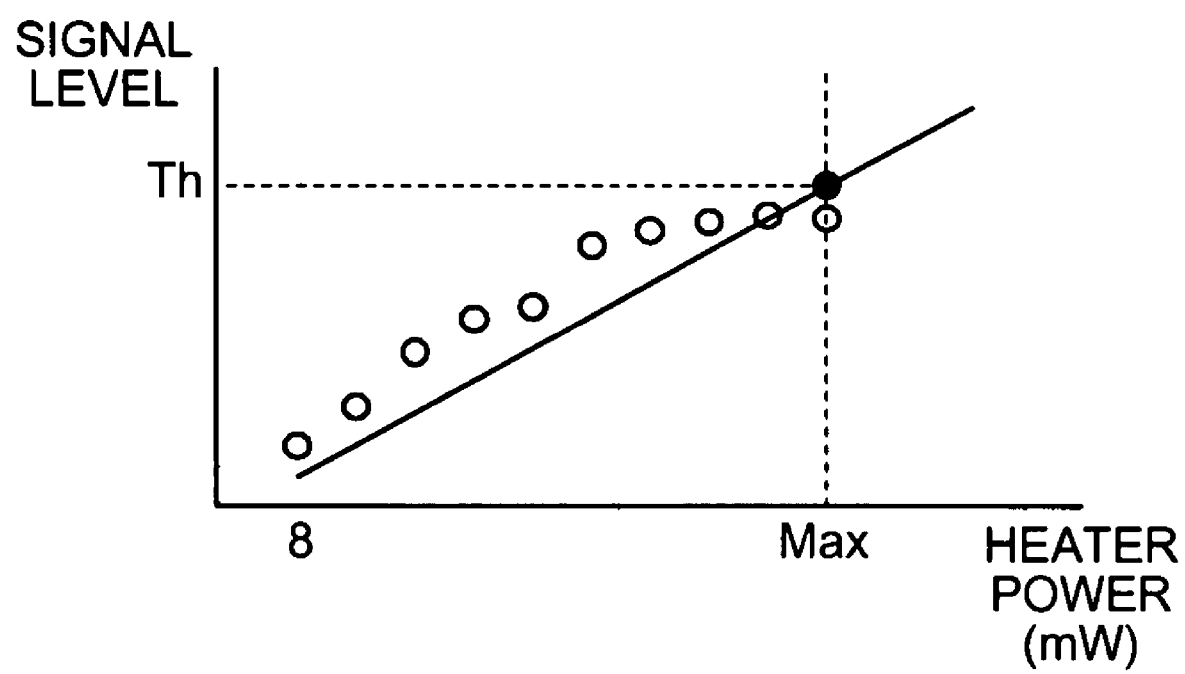
FIG. 5 is a graph for explaining maximum power determining according to the first embodiment.

If the upper-limit determining unit 807 determines as a result of the comparison that the signal level is below the comparative value, as shown in FIG. 5 (Yes at step S110), the upper-limit determining unit 807 determines that touchdown has occurred as the rate of increase of the signal level with the increase in the heater power has decreased to the predetermined threshold, and regards the current heater power as the maximum power (denoted by "Max" in FIG. 5). The maximum power thus determined is set in the heater control unit 801 (step S111). Accordingly, the heater control unit 801 stops stepping up the heater power, and even under normal operating conditions, controls the heater power so that the heater power does not exceed the maximum power.

Thus, the heater power is maintained so that it does not exceed the touchdown point at which the head end 14*b* and the surface of the magnetic disk 15 come into contact with each other, preventing damage to both the head end 14b and the surface of the magnetic disk 15.

Thus, according to the first embodiment, the heater power is increased by a predetermined control range and signal levels are obtained. Samples are generated based on the signal levels, and an approximation line is determined from the samples. The approximation line is shifted to determine the signal-level determining line. If the signal level corresponding to the current heater power is below the comparative value obtained from the signal-level determining line determined at the previous heater power, the current heater power is regarded as the maximum power. In other words, when the rate of increase of the signal level with the increase in heater power decreases to a predetermined threshold, and causes touchdown, the heater power at that point is regarded as the maximum power. As a result, the heater power is appropriately controlled to prevent the head end and the surface of the magnetic disk from continuing to be in contact with each other, thus preventing damage to both the head end and the surface of the magnetic disk.

In a second embodiment of the present invention, sample values are obtained from the variation in the gain instead of from the signal levels, and the approximation line is determined by offsetting the sample values.

The configuration of the magnetic disk device according to the second embodiment is identical to that of the magnetic disk device according to the first embodiment shown in FIG. 1 except for the configuration of the MPU 8 (shown in FIG. 2).

Figure 6:
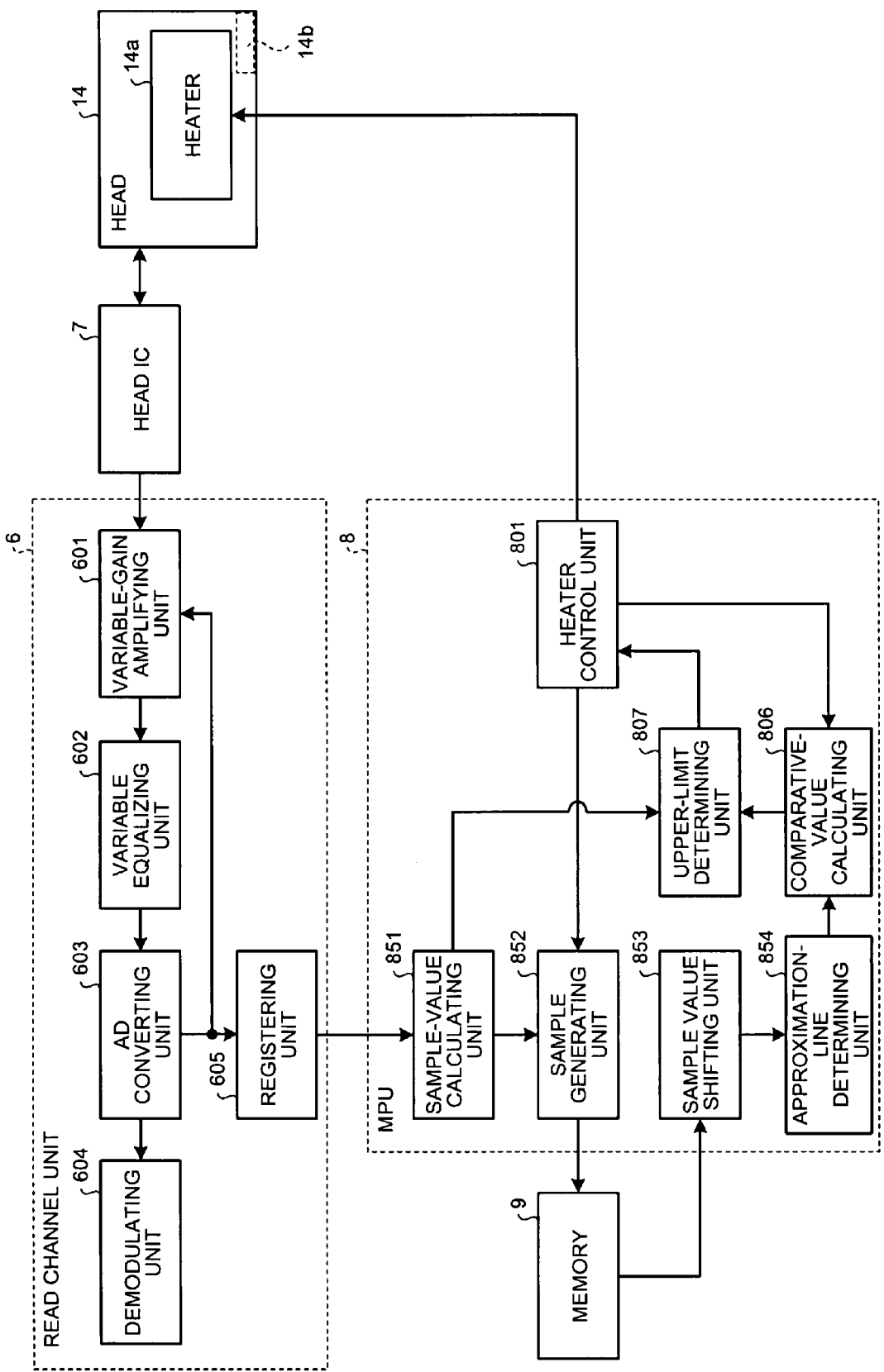
FIG. 6 is a block diagram of principal parts of the magnetic disk device according to a second embodiment of the present invention.

FIG. 6 shows block diagrams of the read channel unit 6 and the MPU 8 of the magnetic disk device according to the second embodiment. The parts in FIG. 6 that are identical to those in FIG. 2 are assigned the same reference numerals and are not described here. As shown in FIG. 6, the MPU 8 includes the heater control unit 801, a sample-value calculating unit 851, a sample generating unit 852, a sample-value shifting unit 853, an approximation-line determining unit 854, the comparative-value calculating unit 806, and the upper-limit determining unit 807.

The sample-value calculating unit 851 calculates the sample value corresponding to the heater power by combining the gain indicated by the gain signal fed by the registering unit 605 of the read channel unit 6 and the sector-wise variation in the gain (hereinafter, "sigma") of the spinning magnetic disk 15. The sample-value calculating unit 851 outputs the generated sample values to the sample generating unit 852 and the upper-limit determining unit 807.

If the signal level of the data signal read from the magnetic disk 15 is small, the gain is large, and if the signal level is large, the gain is small. Consequently, whether touchdown has occurred can be determined by the change in the gain. Further, if the magnetic disk 15 is divided into a plurality of sectors in the circumferential direction, and when touchdown has not occurred, the gain (or signal level) corresponding to the data signals read from each sector is more or less the same, and hence the sigma can be said to be small. However, if touchdown has occurred, there is variation in the gain (or signal level) corresponding to the data signal read from each sector, leading to a large sigma. Therefore, whether touchdown has occurred can also be determined by the change in the sigma. As the gain and the sigma are combined in the second embodiment, samples values can be obtained that are more sensitive and responsive to occurrence of touchdown.

The sample generating unit 852 associates the heater power conveyed by the heater control unit 801 and the sample value output from the sample-value calculating unit 851, and generates samples to be used in the upper limit determining process. As the signal level, and hence the sample value, tends to be unstable when the heater power is in the vicinity of zero, the sample generating unit 852 can be configured to generate samples only when the heater power is above a predetermined initial value. Specifically, the sample generating unit 852 can be configured to generate a sample when the heater power reaches 8 mW or thereabouts. The sample generating unit 852 stores the generated samples in the memory 9.

The sample-value shifting unit 853 reads the samples from the memory 9 and shifts the sample value corresponding to each sample by increasing the sample value by a predetermined range. The sample-value shifting unit 853 then outputs the samples, which are a combination of heater power values and shifted sample values, to the approximation-line determining unit 854.

The approximation-line determining unit 854 determines the approximation line that approximates the shifted sample values in a two-dimensional coordinate system, with the heater power and the sample value forming the coordinate axes. Specifically, the approximation-line determining unit 854 uses the least-square method on the shifted sample value corresponding to each heater power value to decide the approximation line for which the sum of distances corresponding to all the samples is the least.

Figure 7:
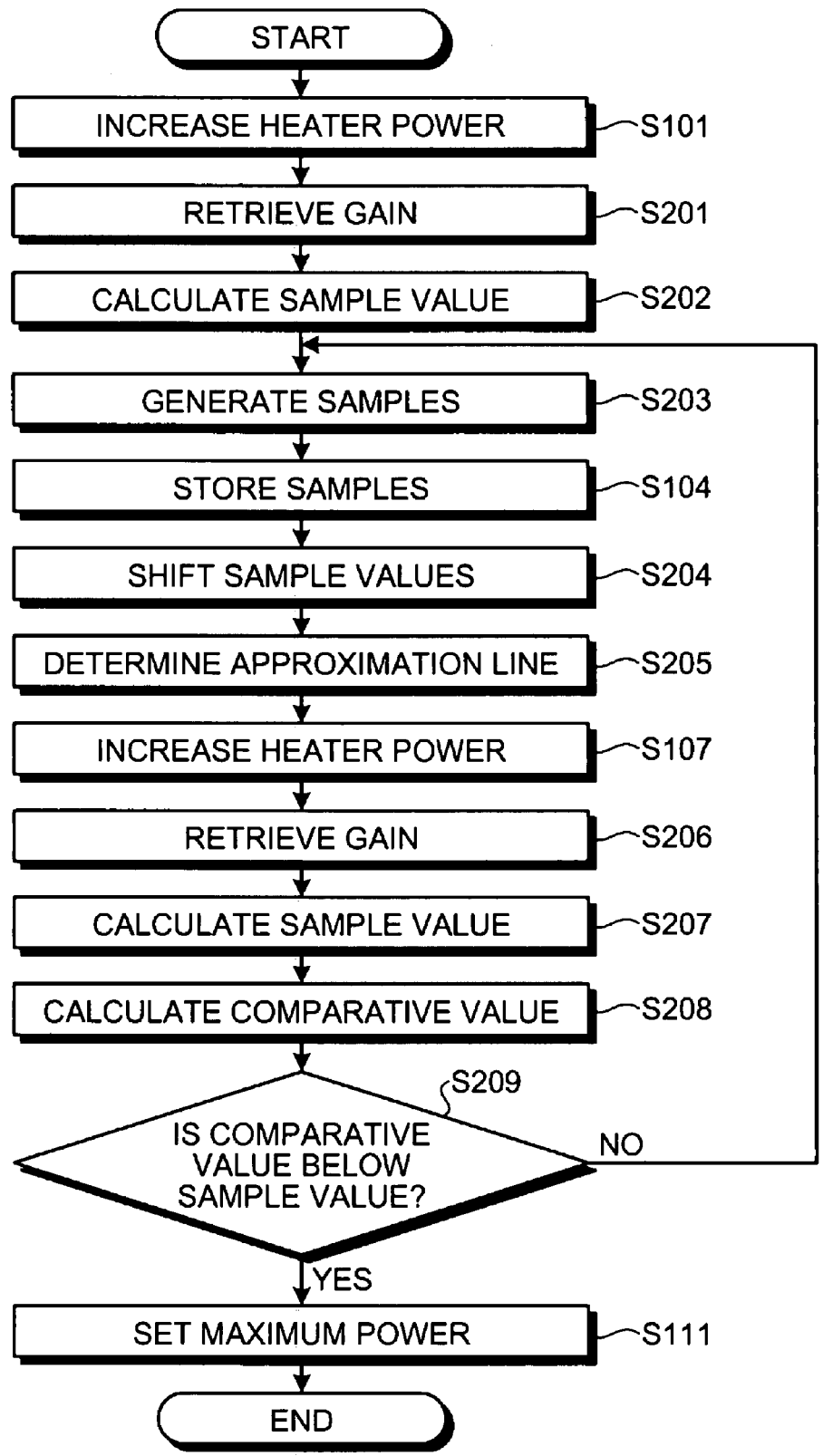
FIG. 7 is a flowchart of the maximum power determining process according to the second embodiment.

A maximum power determining process performed by the magnetic disk device according to the second embodiment is described below. FIG. 7 is a flowchart of the maximum power determining process performed by the magnetic disk device according to the second embodiment. The steps in FIG. 7 that are identical to those in FIG. 3 have been assigned the same reference symbols and are not described here.

Figure 8A:
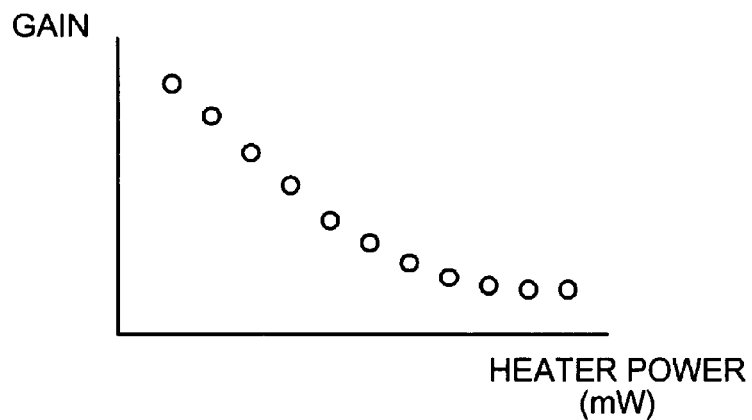
FIGS. 8A, 8B, and 8C are graphs for explaining sample values according to the second embodiment.

The heater control unit 801 increases the heater power of the heater 14a provided within the head 14 by a predetermined control range (step S101) and conveys the heater power to the sample generating unit 852. Due to increase in the heater power, the signal level of the data signals read from the magnetic disk 15 increases, and the gain, output by the read channel unit 6 to maintain the signal level steady, decreases. In other words, as shown in FIG. 8A, as the heater power increases, the gain decreases until the point when touchdown occurs. Once touchdown occurs, the gain does not decrease any further.

Figure 8B:
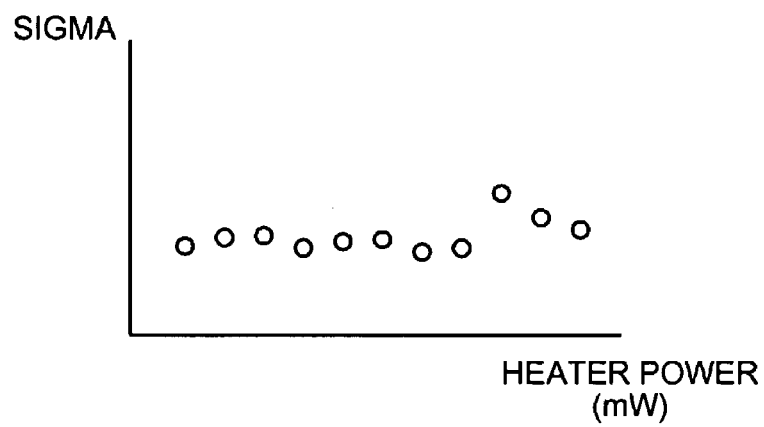
Figure 8C:
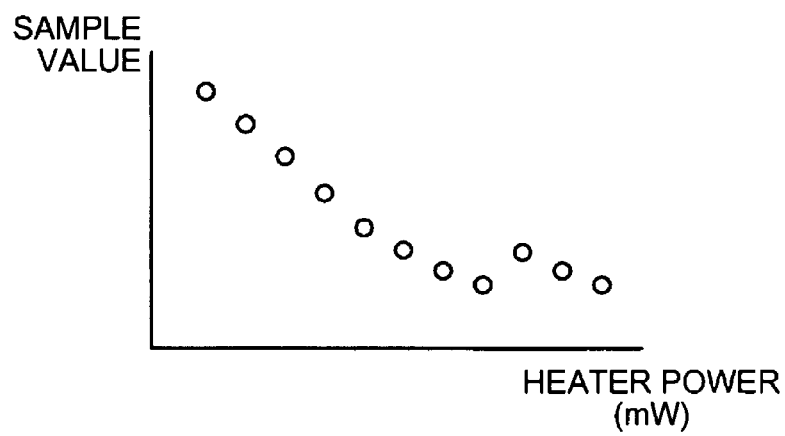

The sample-value calculating unit 851 retrieves the gain signals produced in the read channel unit 6 are retrieved by (step S201) and calculates the sigma that indicates the sector-wise variation in the gain, as well as calculates the sample value by combining the gain and the sigma (step S202). As shown in FIG. 8B, the sigma, which indicates sector-wise variation in the gain, remains substantially steady until the point touchdown occurs, even if the heater power is increased. However, once touchdown occurs, the sigma increases. Occurrence of touchdown can be detected by either the gain or the sigma. However, touchdown can be detected more accurately if the gain and the sigma are combined by the sample-value calculating unit 851 to obtain sample values, as shown in FIG. 8C.

If the current heater power is greater than a predetermined initial value, the sample generating unit 852 associates the heater power values and the sample values, and generates samples (step S203). Specifically, as it is considered that a stable output of signal level, and hence stable sample values, is obtained only when the heater power is greater than a predetermined initial value, for example, 8 mW, the sample generating unit 852 generates samples after the prescribed heater power is reached. The samples are stored in the memory 9 (step S104).

The sample-value shifting unit 853 reads the samples from the memory 9, and shifts the sample value corresponding to each sample by a predetermined range (step S204). In other words, the sample-value shifting unit 853 adds a predetermined value to the sample value corresponding to each sample. In the second embodiment, gain, which reflects a relative value of the signal level, is used as an index of signal level. Therefore, a predetermined value is added to each sample value. However, if the signal levels, that reflect the absolute values of the signal levels, themselves are to be used, the sample value is shifted so that the signal level corresponding to each sample is decreased by a predetermined percentage (for example, 4%). The samples obtained after the sample values are shifted are output to the approximation-line determining unit 854.

The approximation-line determining unit 854 applies the least-square method to determine the approximation line that approximates the samples obtained from shifted sample values (step S205). The approximation line is used for determining whether touchdown has occurred after the heater power is increased by one step, and is output to the comparative-value calculating unit 806.

Meanwhile, the heater control unit 801 increases the heater power of the heater 14a by a control range (step S107) and conveys the increased heater power to the sample generating unit 852 and the comparative-value calculating unit 806. When the heater power is increased, the gain produced in the read channel unit 6 decreases. The sample-value calculating unit 851 retrieves the gain signals indicating the gain (step S206), calculates the sigma, combines the gain and the sigma to obtain the sample value (step S207).

After calculation of the sample values, the comparative-value calculating unit 806 determines, based on the signal-level determining line determined before the heater power was increased, whether the current increased heater power is the maximum power. In other words, upon being conveyed the heater power by the heater control unit 801, the comparative-value calculating unit 806 calculates a comparative value for comparing with the current heater power (step S208). Specifically, the comparative-value calculating unit 806 calculates the signal level at the increased heater power as a comparative value on the signal-level determining line determined at the previous heater power. In the example shown in FIG. 9, the signal-level determining line is indicated by a solid line, and the comparative value (indicated by a solid circle) calculated on the approximation line is indicated by Th. The comparative value Th indicates a sample value based on which it is determined that touchdown has occurred at the current heater power.

The upper-limit determining unit 807 compares the sample value output by the sample-value calculating unit 851 and the comparative value output by the comparative-value calculating unit 806 and determines the magnitudes of the sample value and the comparative value (step S209). If, as a result, the sample value is below the comparative value (No at step S209), the upper-limit determining unit 807 determines that touchdown has not occurred as the rate of decrease of the gain with the increase in the heater power is still above a predetermined threshold, and once again samples are generated at the current increased heater power, the sample values are shifted, and the signal-level determining line is determined.

Figure 9:
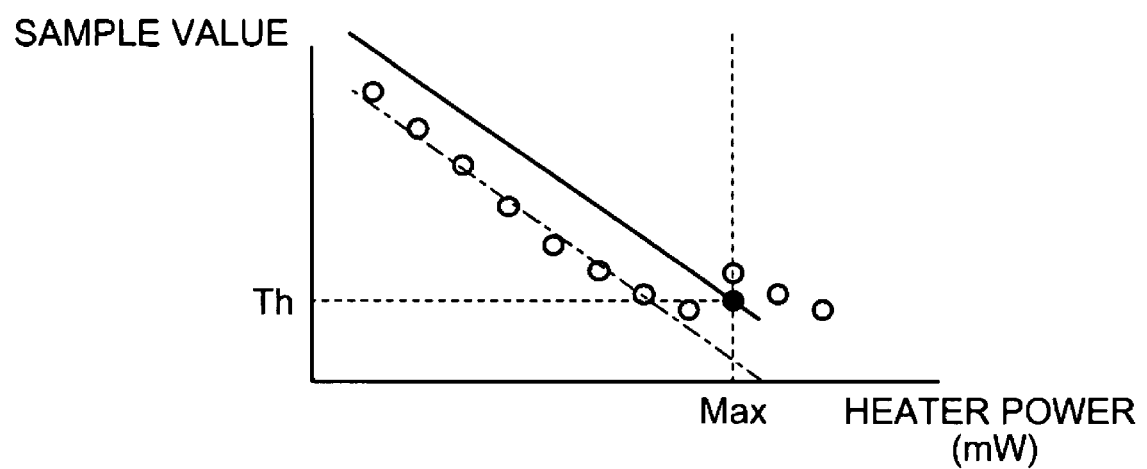
FIG. 9 is a graph for explaining the maximum power determining according to the second embodiment.

If, as a result of comparison by the upper-limit determining unit 807, the sample value is above the comparative value (Yes at step S209), the upper-limit determining unit 807 determines that touchdown has occurred as the rate of decrease of the gain with the increase in the heater power has dropped below a predetermined threshold, and regards the current heater power to be the maximum power (denoted by "Max" in FIG. 9). The maximum power thus determined is set in the heater control unit 801 (step S111), after which the heater control unit 801 stops stepping up the heater power. Under normal operating conditions, the heater control unit 801 controls the heater power to a level below the maximum power.

Thus, the heater power is maintained so that it does not exceed the touchdown point at which the head end 14b and the surface of the magnetic disk 15 come into contact with each other, preventing damage to both the head end 14b and the surface of the magnetic disk 15.

Thus, according to the second embodiment, sample values, which are a combination of gain and sigma obtained by stepping up the heater power by a predetermined control range, are increased by a predetermined range. The approximation line after the sample values are shifted is determined. If the current heater power is above the comparison value obtained from the approximation line determined at the previous heater power, then the current heater power is regarded as the maximum power. Thus, that heater power is regarded as the maximum power at which touchdown occurs as the rate of decrease in the sample value with the increase in the heater power is below a predetermined threshold, enabling the heater power to be controlled more appropriately.

The combination of sample and the determination method of the signal level determining functions in the first embodiment and the second embodiment can be interchanged. In other words, in the first embodiment, signal level is regarded as the sample, and signal level determining function is determined after first determining the approximation line and then shifting the approximation line. In the second embodiment, a combination of gain and the sigma is regarded as the sample, and signal level determining function is determined after first shifting the sample and then determining the approximation line. However, signal level can be regarded as the sample, and the signal level determining function can be determined by first shifting the signal level and then determining the approximation line. The signal level and the gain can be regarded as samples independently or by combining the two with the sigma.

The MPU 8 can be configured to execute a computer program introduced into the magnetic disk device 1 from an external source to perform the calibration process in the first embodiment. Alternatively, a central processing unit (CPU) or a micro controller unit (MCU) can be configured to execute the computer program.

In the first and the second embodiments, rather than using the samples themselves or the approximation line itself to determine the signal level determining function, the samples or the approximation line is shifted and then used to determine the signal level determining function. Detection results of the touchdown point using the signal level determining function determined by the present invention and by a known method are compared below with reference to histograms shown in FIGS. 10A and 10B.

Figure 10A:
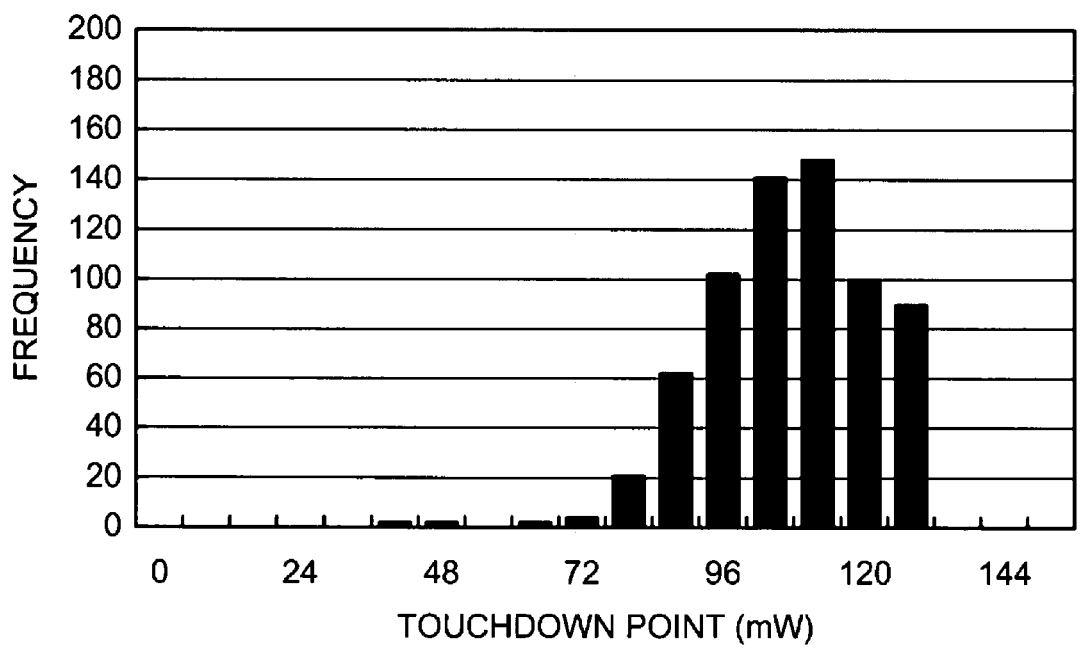
FIGS. 10A and 10B are histograms for explaining detection results of touchdown point.

FIG. 10A is a histogram of detection result of the touchdown point by using a common method such as by acoustic emission sensor (AE sensor). In this method, detection is not possible when the touchdown point goes beyond 120 mW. Further, maximum number of touchdown points detected is between 104-112 mW.

Figure 10B:
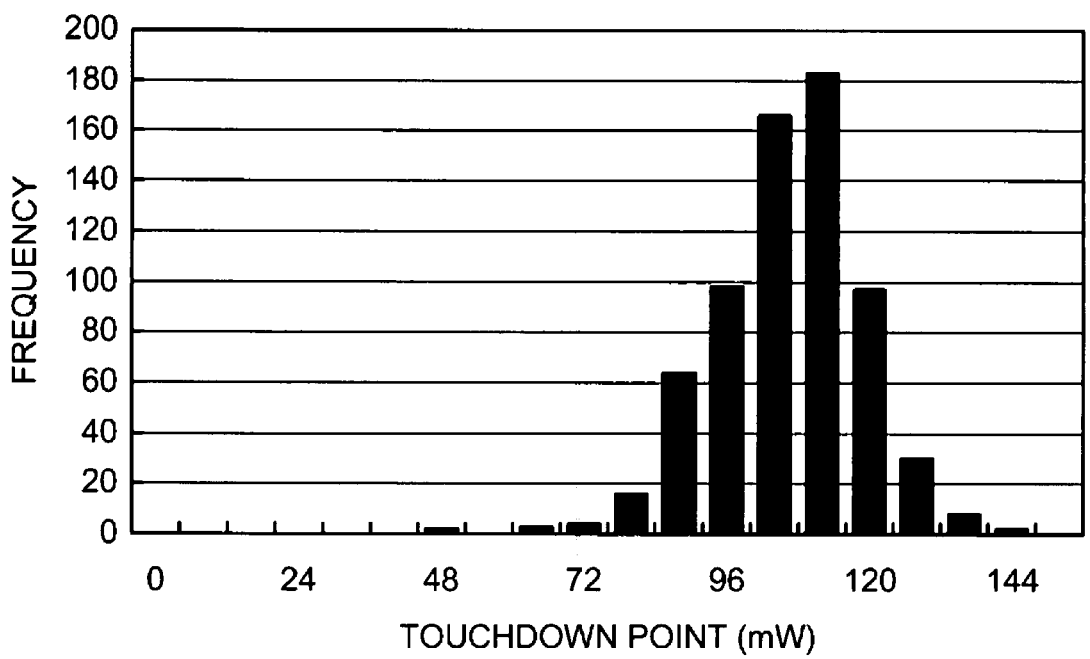
Figure 11:
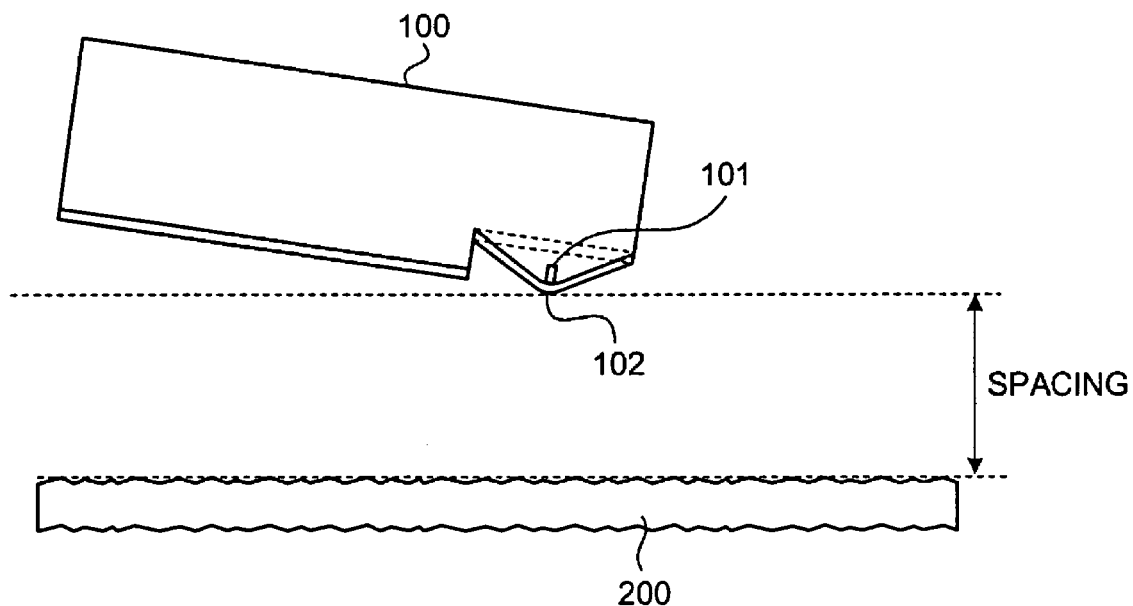
FIG. 11 is an enlarged view of a head and a magnetic disk surface.
Figure 12:
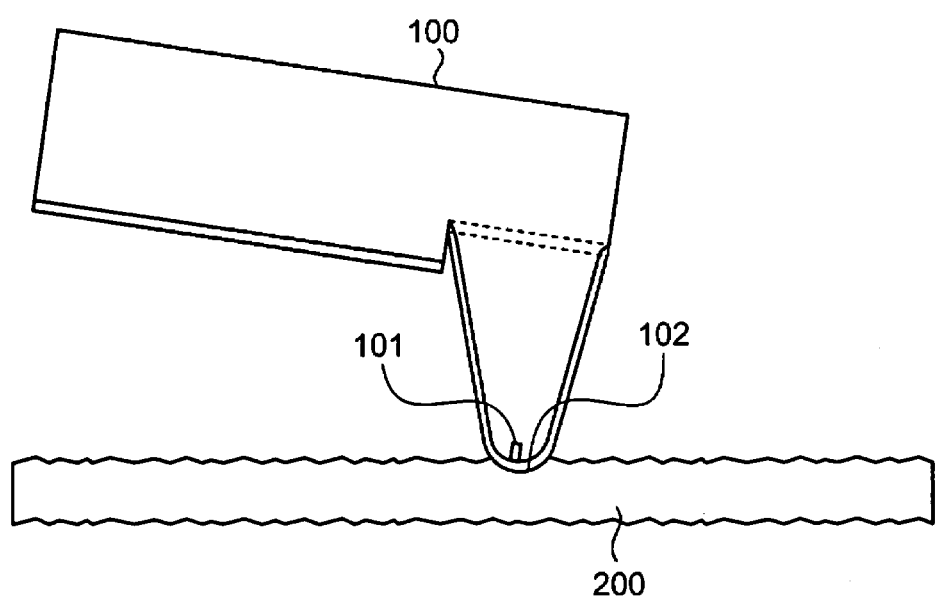
FIG. 12 is a drawing of the head and the magnetic disk surface showing touchdown.

FIG. 10B is a histogram of detection result of the touchdown point by using the method according to the present invention. In this method, touchdown point can be detected even beyond 128 mW. In other respects, the histogram is substantially similar to the histogram obtained by employing the known method. This indicates that accurate detection of the touchdown point can be made by employing the method according to the present invention, and as a result, the upper limit of the heater power can be appropriately set.

As set forth hereinabove, according to an embodiment of the present invention, using a signal-level determining function determined from samples obtained up to the previous heater power, an index value of a signal level, considered to be one at which the head end and the storage medium will come into contact with each other, is calculated as a comparative value at the current heater power. The maximum power can be determined by comparing the comparative value and the index value of the actual signal level. Thus, the heater power can be controlled appropriately to prevent the head end and the magnetic disk surface coming into contact with each other and the resulting damage to the both.

Moreover, it can be detected from the signal-level determining function that the increase in the signal level with the increase in the heater power has decreased to a threshold corresponding to the magnitude to which the approximation line has been shifted. The heater power at which the rate of increase of the signal level with the increase in the heater power decreases to a predetermined threshold due to the head end the storage medium coming into contact with each other is taken as the maximum power.

Furthermore, damage to the head and the storage medium can be prevented by appropriately controlling the heater power, enhancing the reliability and usable life of the device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head control device that controls, by thermal expansion caused by a heater, a position of a head that faces a storage medium and reads signals of data recorded on the storage medium, the head control device comprising:
    a control unit that increases heater power of the heater by a predetermined range;
    an obtaining unit that obtains a sample of an index value of a signal level read from the storage medium at each heater power controlled by the control unit;
    a function determining unit that determines a determining function for determining current heater power based on samples obtained by the obtaining unit;
    a calculating unit that calculates a comparative value corresponding to the current heater power based on the determining function; and
    a maximum-power determining unit that determines whether the current heater power is maximum power by comparing the comparative value and the index value of the signal level corresponding to the current heater power,
    wherein the function determining unit includes
        an approximation-line determining unit that determines an approximation line that approximates a plurality of samples obtained by the obtaining unit in a two-dimensional coordinate system with the heater power and the index value of the signal level as coordinate axes, and
        a line shifting unit that shifts the approximation line, and the function determining unit determines a function represented by shifted approximation line as the determining function.

2. The head control device according to claim 1, wherein the line shifting unit increases or decreases index values of signal levels on the approximation line by a predetermined percentage.

3. The head control device according to claim 1, wherein the line shifting unit increases or decreases index values of signal levels on the approximation line by a predetermined value.

4. The head control device according to claim 1, wherein the obtaining unit obtains the signal level read from the storage medium as the sample of the index value.

5. The head control device according to claim 4, wherein the maximum-power determining unit determines that the current heater power is the maximum power when the comparative value is equal to or larger than the index value corresponding to the current heater power.

6. The head control device according to claim 1, wherein the obtaining unit obtains samples of index values that include variations in signal level from a plurality of sectors of the storage medium.

7. The head control device according to claim 1, wherein the obtaining unit obtains the sample when the heater power is equal to or greater than a predetermined initial value.

8. The head control device according to claim 1, wherein the obtaining unit obtains a gain to amplify the signal level read from the storage medium to a predetermined level as the sample of the index value.

9. The head control device according to claim 8, the maximum-power determining unit determines that the current heater power is the maximum power when the comparative value is less than the index value corresponding to the current heater power.

10. A storage device that stores data in a storage medium, the storage device comprising:
    a recording and reproducing unit that faces the storage medium and reads signals from and writes signals to the storage medium;
    a heater that adjusts a position of the recording and reproducing unit by thermal expansion;
    a control unit that increases heater power of the heater by a predetermined range;
    an obtaining unit that obtains a sample of an index value of a signal level read from the storage medium at each heater power controlled by the control unit;
    a function determining unit that determines a function for determining current heater power based on samples obtained by the obtaining unit;
    a calculating unit that calculates a comparative value corresponding to the current heater power based on the function; and
    a maximum-power determining unit that determines whether the current heater power is maximum power by comparing the comparative value and the index value of the signal level corresponding to the current heater power;
    wherein the function determining unit includes
        an approximation-line determining unit that determines an approximation line that approximates a plurality of samples obtained by the obtaining unit in a two-dimensional coordinate system with the heater power and the index value of the signal level as coordinate axes, and
        a line shifting unit that shifts the approximation line, and the function determining unit determines a function represented by shifted approximation line as the function.

11. A maximum power determining method for determining maximum power of a heater that controls, by thermal expansion, a position of a head that faces a storage medium and reads signals of data recorded on the storage medium, the maximum power determining method comprising:
- first increasing heater power of the heater by a predetermined range;
- obtaining a sample of an index value of a signal level read from the storage medium at each heater power controlled at the first increasing;
- determining a function for determining current heater power based on the sample obtained at the obtaining;
- second increasing heater power of the heater by a predetermined range;
- calculating a comparative value corresponding to the heater power controlled at the second increasing based on the function;
- comparing the comparative value and the index value of the signal level corresponding to the heater power controlled at the second increasing; and
- determining whether the heater power controlled at the second increasing is maximum power,
- wherein the determining function includes
  - determining an approximation line that approximates a plurality of samples obtained by the obtaining unit in a two-dimensional coordinate system with the heater power and the index value of the signal level as coordinate axes, and
  - shifting the approximate line, and
  - determining a function represented by shifted approximation line as the function.

* * * * *